United States Patent [19]

Takayama

[11] Patent Number: 4,491,873
[45] Date of Patent: Jan. 1, 1985

[54] COMMON CONTROLLED FACSIMILE SYSTEM

[75] Inventor: Shoichiro Takayama, Tokyo, Japan

[73] Assignee: Oki Electric Industry Co., Ltd., Tokyo, Japan

[21] Appl. No.: 324,597

[22] Filed: Nov. 24, 1981

[30] Foreign Application Priority Data

Dec. 3, 1980 [JP] Japan ................... 55-169694
Feb. 4, 1981 [JP] Japan ................... 56-14402

[51] Int. Cl.³ .............................. H04N 1/00
[52] U.S. Cl. ........................ 358/256; 358/260; 364/514
[58] Field of Search ............ 358/256, 903, 102, 260; 364/514, 515, 200, 900; 382/56

[56] References Cited

U.S. PATENT DOCUMENTS 3,751,582  8/1973  Wernikoff et al. ............ 358/903
3,798,610  3/1974  Bliss et al. .................. 358/903
4,110,794  8/1978  Lester et al. ................ 358/256
4,319,283  3/1982  Ozawa et al. ................ 358/286

OTHER PUBLICATIONS

M. K. Bush, "Display of Stored Images", IBM Technical Disclosure Bulletin, vol. 18, No. 1, 6-73.

Primary Examiner—John C. Martin
Assistant Examiner—Edward L. Coles
Attorney, Agent, or Firm—Armstrong, Nikaido, Marmelstein & Kubovcik

[57] ABSTRACT

A common controlled facsimile system which has a plurality of simple facsimile terminals commonly controlled by a single control system. Each facsimile terminal has means (21) for converting picture data to electrical signals, and means (22) for reproducing picture images from said electrical signals. The common control system has a disk memory (39) with large capacity. A picture image generated by a first facsimile terminal is first stored in the disk (39) of the common control system, and later, the picture image in the disk memory (39) is transferred to another facsimile terminal. The common control system functions also to convert coded data to a picture image, and to edit or correct a picture image. Further, the common control system functions to convert one facsimile technical standard to another; thus, facsimile communication between different standard terminals is possible. The present invention permits the provision of a personal facsimile terminal to each person in an office, like a personal telephone set at present.

3 Claims, 9 Drawing Figures

COMMON CONTROLLED FACSIMILE SYSTEM

BACKGROUND OF THE INVENTION

The present invention relates to a facsimile system and, in particular, relates to a system of common control type, in which a plurality of simple facsimile transmitters and receivers are controlled commonly by a single common control system. That common control system may be included in a telephone exchange system. The present facsimile system has the advantage that the system can communicate with any facsimile system irrespective of the difference of the technical standard of a communication line and/or a facsimile apparatus.

Figure 1:
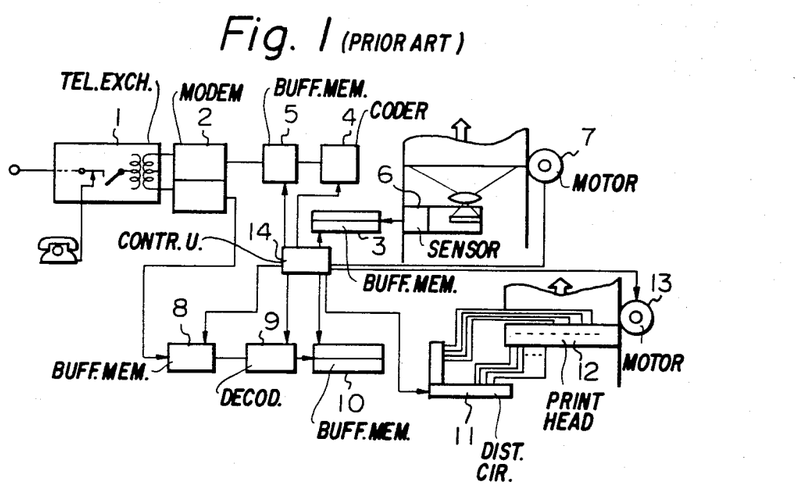
FIG. 1 is a block diagram of a prior facsimile system.

A prior facsimile system is shown in FIG. 1, in which the reference numeral 1 is a control system of an exchange network, 2 is a modem, 3 is a buffer memory having the capacity of several lines for picture lines, 4 is a coder for coding a picture signal, 5 is a buffer memory for a transmission signal, 6 is a picture sensor and a light, 7 is a pulse motor for feeding a paper for every line, 8 is a buffer memory for a reception signal, 9 is a decoder for decoding a reception signal, 10 is a buffer memory for storing several lines of reception picture signal, 11 is a print head driver and picture distribution circuit, 12 is a print head, 13 is a pulse motor for feeding a paper for every line, and 14 is a control unit and power supply. In some cases, the reception side of a facsimile system also includes a picture developing and fixing system.

However, a prior facsimile system has the disadvantage that the system has many components and is complicated, since each terminal has its own control system. Further, a prior facsimile system has the disadvantage that hardware and/or software for processing the communication procedure defined for a facsimile communication are complicated, and have no compatibility with other facsimile systems. A facsimile communication might be impossible if a modem, or a control procedure of a modem, or a communication procedure of a facsimile system is different from that of the other party. Although the CCITT issued the international standards G1, G2 and G3, communication among those standards is impossible, and if a facsimile system functions to convert those standards, the price of the facsimile system might become higher.

While each person in an office has his own telephone set personally, he does not have a facsimile terminal. Therefore, he must bring an original document to be transmitted to a facsimile machine room on foot, and must go to a machine room on foot to receive a facsimile letter. Further, a facsimile letter can not be confidential.

SUMMARY OF THE INVENTION

It is an object, therefore, of the present invention to overcome the disadvantages and limitations of a prior facsimile system by providing a new and improved facsimile system.

It is also an object of the present invention to provide a new and improved facsimile system in which a plurality of simple terminal equipments are commonly controlled by a common single controller.

Another object of the present invention is to provide a facsimile system which can handle any facsimile technical standard, including G2 and G3 international standards.

Still another object of the present invention is to provide a facsimile system in which any person can have his own facsimile terminal personally, like a telephone set in an office at present.

Still another object of the present invention is to provide a facsimile system in which a man can transmit and/or receive a facsimile letter confidentially by using his own personal facsimile terminal.

The above and other objects are attained by a facsimile system comprising a plurality of facsimile terminals, each having means for converting a picture pattern of an original document to a scanned electrical signal, and means for printing a scanned electrical signal on a paper, and a facsimile common control system having a common disk memory coupled with said facsimile terminals through a switching exchange network. According to the present invention, a picture image generated by one of the facsimile terminals is first stored in said disk memory, and then, the stored picture image is transferred to a designated facsimile terminal through said switching exchange network to reproduce an image. A terminal may be a key board type terminal which generates a coded character, and in this case, a coded character is converted to a picture pattern by a character generator in said common control system.

Preferably, the common control system functions to convert the technical standard for the facsimile communication for each terminal.

Preferably, a picture image is stored in said disk memory in a compressed form.

Preferably, said switching exchange network is coupled with outside telephone channels for coupling inside facsimile terminals with external terminals through a telephone line.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

FIG. 2 shows the structure of the terminal equipment according to the present facsimile system. In the figure, the reference numeral 23 is a carriage having a read-head 21 and a printing head 22. The carriage 23 travels horizontally as shown in FIG. 2(b) along the guides 23a, scanning a paper 24 (original paper 24a, and printing paper 24b). The original paper 24a travels between the roller 21a and the read-head 21, and the information on that original paper is read by the read-head 21. The printing paper 24b is rolled out from a paper roll 22a, and travels in front of the printing head 22, which prints on that printing paper.

In the present embodiment, it is supposed that the read-head 21 and the printing head 22 are composed of a plurality of picture cells (for instance, the number of cells is in the range from 16 to 128). Therefore, the read-head 21 scans that number of cell in the vertical direction at the same time, and the read-head 21 travels in the horizontal direction A (see FIG. 2(c)). When the read-head reaches the right end of the paper 24a, the paper travels in the vertical direction B by the length equal to the number of cells that the read-head 21 has. Then, the read-head 21 travels and scans the paper 24a again.

Figure 2A:
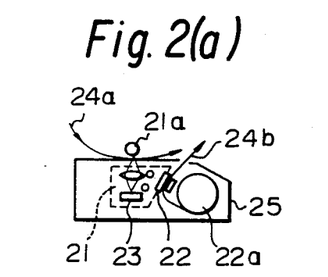
FIGS. 2(a) through 2(d) are schematic illustrations of the structure of the terminal equipment according to the present facsimile system.
Figure 2B:
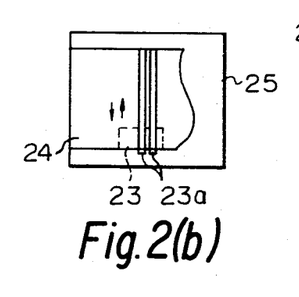
Figure 2C:
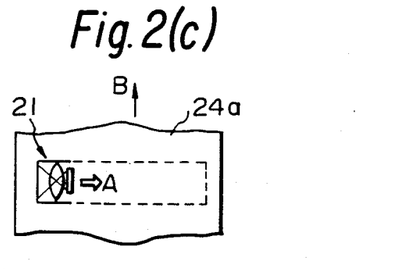
Figure 2D:
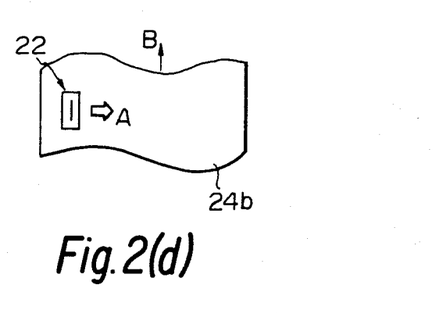

Similarly, the printing head 22 scans the printing paper 24b, travelling in the horizontal direction A, and when that printing head 22 reaches the right end of the paper, the paper travels in the vertical direction B. The number of cells in the vertical direction scanned at the same time by the printing head 22 is the same as that of the read-head 21. Accordingly, it should be noted that the structure of the present read-head and the printing head is simple, since they are the so-called serial type head, and those heads do not have enough cells to scan the whole horizontal line at the same time.

The read-head 21 has a plurality of optical-electrical converter-cells, the outputs of which are forwarded to the common control system in a serial signal form. Therefore, no buffer memory is installed in the terminal equipment.

The printer head 22 may be any type of printing head, including a thermal head which prints on a treated thermal paper by selectively heating the cell, an ink-jet printer, and/or an electrostatic type printer. The printing head 22 stores the data for printing one column from the common control system, and prints them on the printing paper until the next column of data is received.

It should be appreciated that the present terminal equipment is very simple in structure, since it has only the read-mechanism, and the printing mechanism, but does not have any control unit.

Figure 3:
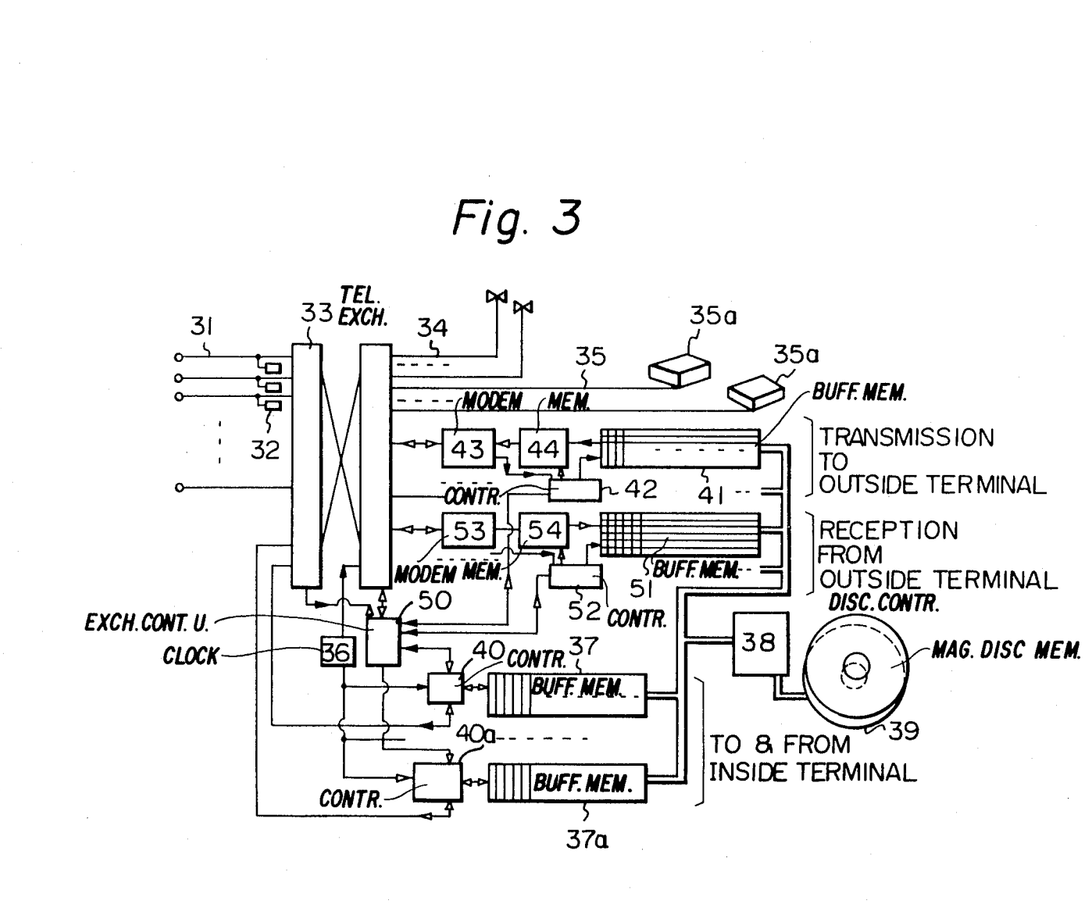
FIG. 3 is a block diagram of the common control system for the present facsimile system.

FIG. 3 shows a block diagram of the present invention's common control system which controls a plurality of facsimile terminal apparatuses, and is coupled with other facsimile systems through a public telephone line. In the figure, the reference numeral 31 is a public telephone line, 32 is a reception circuit of the called signal in the telephone line, 33 is a switching network for exchanging telephone channels, 34 is an extension telephone line, 35 is an extension line for a facsimile terminal, which may be either for the use of facsimile communication only, or common to facsimile communication and telephone communication. The reference numeral 35a is a facsimile terminal equipment as shown in FIG. 2. The reference numeral 36 is a clock signal generator which supplies the clock signal to the facsimile terminal equipment through a line different from the picture signal transmission line. The reference numeral 37 is a buffer memory for storing the picture data to and from the terminal equipment 35a. The content of that buffer memory 37 is then stored in the magnetic disk memory 39 which has big storage capacity, through the disk control system 38 in a predetermined time, for instance 100 msec. When the content of the magnetic disk 39 is read, that data from the disk 39 is first stored temporarily in the buffer memory 37. The buffer memory 37 has cells which number in the range from 16 to 128 in the vertical direction, and the cells which number in the range from 1728 to 2048 in the horizontal direction. The number of cells in the vertical direction depends upon the number of cells of the read-head 21 and the printing head 22, and the number of cells in the horizontal direction depends upon the width of the printing paper. The content of the buffer memory 37 is transferred to the disk memory 39 for each scanning or travelling of the carriage. When a picture signal is transferred to the disk memory 39, a header information which includes the address that the picture signal is to be transmitted to is also written in the disk memory 39. The content of the buffer memory 37 is stored in a single track or in a sector in the track of the disk memory 39, and then, a data having a picture information and a header information is provided on a disk memory 39. The controller 40 controls the address and the input/output of the disk memory 39.

When the content of the disk memory 39 is to be transferred to another facsimile equipment, the header information is first read from the disk memory 39. Then, the address that the picture is to be forwarded is recognized from the header information. When the address to which the picture is to be forwarded shows the facsimile system within the same building as that in which the common control system is installed, the available buffer memory 37 is selected. Then, that selected buffer memory 37 is coupled with the called facsimile system through the switching network 33. Then, the disk memory 39 transfers the picture data of a single scanning data to the selected buffer memory 37, which transfers the content of the same to the called facsimile terminal equipment. The transmission of the picture signal from the buffer memory 37 to the called facsimile terminal equipment is performed for each vertical lines (16–128 cells). When all the data in the buffer memory 37 is forwarded to the called terminal, the new data of the new vertical scanning line is supplied to the buffer memory 37 from the disk memory 39. By repeating the above process, a whole page of picture information is forwarded from the disk memory 39 to the called facsimile terminal equipment. Since picture information is stored in the disk memory 39, that picture information is transferred to the called terminal when that called terminal is not busy. Further, the same picture can be distributed to a plurality of facsimile terminals.

When the designated address shows an outside facsimile terminal which is installed outside the building, the header and the first picture data are supplied to the other buffer memory 41 from the disk memory 39. The control unit 42 inspects the header, and asks the control unit 50 of the exchange system 33 to connect the calling facsimile terminal to the called facsimile terminal. In this case, the switching network 33 forwards the signals for establishing a telephone channel. After the telephone channel is established, the facsimile communication is accomplished according to the predetermined protocol (communication procedure in a facsimile system), with the called remote facsimile terminal. When G3 standard is utilized, the protocol is accomplished using a 300 baud modem, and then, a picture communication is accomplished with the communication speed of 4800 baud/second, or 2400 baud/second. When G2 international standard is utilized, the protocol is accomplished using a tone signal, and a picture signal is transmitted using an AM-PM-VSB modem. The reference numeral 43 is a modem for forwarding and receiving a picture signal and a protocol signal. When a picture signal is transmitted, the control 42 effects the coding of the picture signal in the buffer memory 41 to the predetermined coded signal, like a Hoffman code signal. The coded signal is stored in the FIFO (first-in-first-out) memory 44. The picture signal in the FIFO memory 44 is transmitted to the called facsimile system through the exchange network 33 with the predetermined transmission speed. When the data for a single scanning has been forwarded, or all the data in the buffer memory 41 is forwarded, next data for the next scanning is provided to the buffer memory 41 from the disk memory 39 within a predetermined time (for instance 100 msec). That operation is repeated, and when the entire picture information has been transmitted for a whole page, the protocol for terminating the communication is performed, and the communication for that page is finished.

It should be appreciated that the present system can function easily to re-call the other terminal when that terminal is busy, or when establishment of the circuit does not succeed, and to forward the same picture signal to a plurality of facsimile terminals at the same time, because of the presence of the disk memory 39 which stores the whole picture data.

The operation for receiving a picture signal from an outside facsimile terminal is as follows. Some particular telephone channels among the telephone channels installed in the switching network 33 are designated for the facsimile communications purpose only. When a facsimile call is received in those facsimile channels, the reception circuit 32 detects that facsimile call, and has the switching network 33 connect the reception facsimile call to the reception modem 53, and the reception call control 52 starts the protocol procedure for establishing the facsimile communication. The reception modem 53 is composed of the reception circuit of the high speed digital modem, and the both-way modem of the 300 baud modem, or the combination of that both-way 300 baud modem and the reception circuit of a low speed modem. When a picture signal is received, that picture signal is stored in the FIFO (first-in-first-out) memory 54. Then, the control 52 reads the content of the FIFO memory 54 one bit after another to decode the received Hoffmann code, and the decoded picture signal is stored in the buffer memory 51. When the buffer memory 51 stores the picture signal for one scanning line, that picture signal is transferred to the disk memory 39 within 100 msec. By repeating the above operation, a whole picture signal for a page is obtained on a disk memory 39. Then, the protocol procedure is accomplished for finishing the facsimile communication. Next, the control 38 inspects the header portion at the top of the picture signal thus stored in the disk memory 39, and said control 38 has the switching network 33 connect the facsimile signal on the disk memory 39 to the designated facsimile terminal 35a through the buffer memory 37, the control 40, and the exchange control 50. The picture signal is stored in the disk memory 39, and is read-out from that memory 39 to the buffer memory 37; then, the picture signal for each scanning line is transferred to the designated facsimile terminal 35a. When the reception operation or the printing operation for one scanning line is finished in the facsimile terminal 35a, the picture information for the next scanning line is read-out to the buffer memory 37 from the disk memory 39, and the printing operation is accomplished in the facsimile terminal 35a. Thus, the reception operation from an outside facsimile terminal is completed.

It should be noted that the present system may repeat the reception facsimile signal to another outside facsimile terminal, after a picture signal is once stored in a disk memory. Further, the present system may convert the facsimile communication system among G2, G3 and/or the future possible G4 standard.

The above explanation is described for a facsimile terminal having the carriage 21 of FIG. 2, which has a movable read-head and a movable printing head each of which processes a plurality of cells in a vertical line at the same time. However, it should be noted that the present invention is of course applicable to other types facsimile terminal, for instance, a facsimile terminal having a flat-bed type head which has a plurality of cells for the single horizontal line, by modifying the buffer memories 41, 51, and 37. Further, the conversion of the facsimile signal between that of the movable carriage and that of the fixed flat-type head is also possible.

In order to facilitate the processing by the disk 39 may process of a plurality of facsimile communications at the same time, a plurality of buffer memories may be installed. Thus, an additional buffer memory 37 and the control 40 are provided for coupling the disk memory 39 with an internal facsimile terminal. This memory and the control are designated as 37a and 40a in FIG. 3. Similarly, the same module as (41-42-43-44) may be provided for transferring the picture data in the disk 39 to an outside facsimile terminal. Further, the same module as (51-52-53-54) may be provided to receive a facsimile data from an outside facsimile terminal to the disk memory 39.

Figure 4:
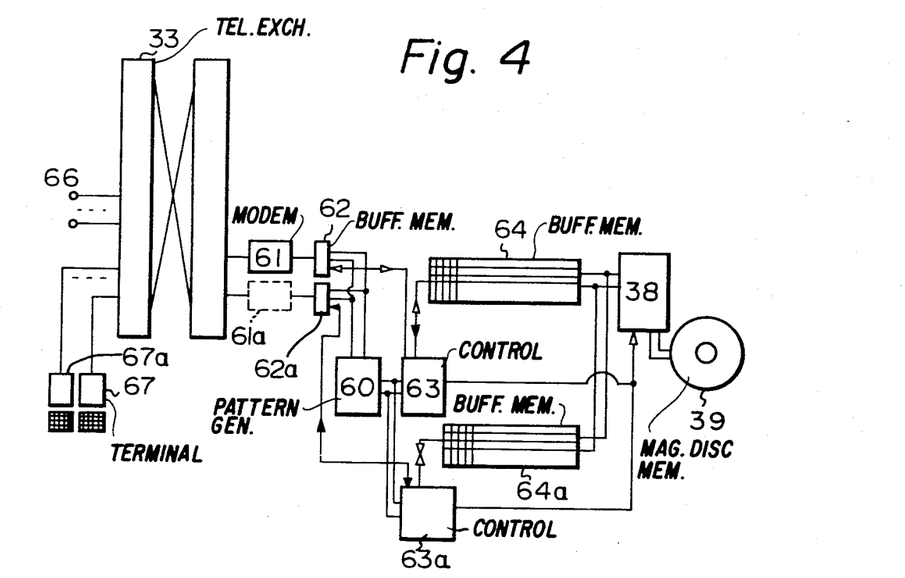
FIG. 4 is another block diagram of the common control system for the present facsimile system.

FIG. 4 shows a block diagram of another embodiment of the present facsimile system, and the feature of this embodiment is the presence of the pattern generator 60. In the figure, the exchange network 33 is the same as that 33 in FIG. 3, except that a low speed asynchronous modem 61 (300 baud/sec to 1200 baud/sec) is provided. In this embodiment, a coded signal (not a scanned picture signal) from an inside terminal 67 or an outside terminal through a telephone line 66 is received by said modem 61. That coded signal represents a character, a letter, and/or a function code, and the coded signal for 100 msec is stored in the buffer memory 62. Thus, the buffer memory 62 stores one byte or two bytes of coded signal, which is applied to the pattern generator 60. The pattern generator 60 generates a character pattern of each coded signal and recognizes a function code, and then, the output of the pattern generator 60 is applied to the control 63. The control 63 transfer the pattern signal to the buffer memory 64 for each vertical scanning line (having 16-128 cells). The operation of the buffer memory 64 is similar to that of the previous buffer memory 51 of FIG. 3. When the buffer memory 64 receives a line return code, or the buffer memory 64 stores the data for the full horizontal line, the content of the buffer memory 64 is transferred to the disk memory 39 within 100 msec. Thus, the document data in the the picture information form is provided on the disk memory 39. The picture information on the disk 39 is printed on a facsimile terminal in the same manner as that described in accordance with FIG. 3. In order to facilitate the simultaneous operation, a plurality of modules (61-62-63-64) and (61a-62a-63a-64a) may be provided.

Figure 5:
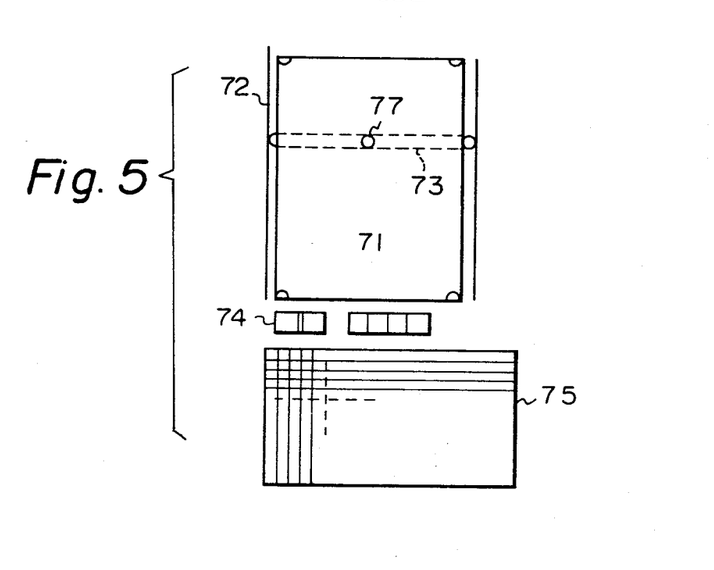
FIG. 5 is an block diagram of an example of the terminal equipment for the present facsimile system.

The terminal equipment 67 for providing a coded character signal may be an ordinary key-board type terminal. FIG. 5 is the modification of the terminal 67, and the terminal of FIG. 5 can function as an English word processor and a Japanese word processor.

In FIG. 5, the reference numeral 75 shows a flat key board, having a plurality of cells in a matrix arrangement. When that key board is used as a Japanese terminal, the number of cells is, for instance, 2000 or more. When one of the cells is pushed with a pen, that cell generates a coded signal by detecting the pressure of the pen. The reference numeral 74 shows a plurality of function keys for carriage return, backspace, correction, deletion, insertion, clear copy, and/or printing, and those function keys transfer the corresponding coded signal upon depression. The reference numeral 71 is an indicator which shows the arrangement of characters by showing the position of each depressed character on a paper. The reference numeral 72 is a line position control, 73 is a carriage position control, and 77 is a small lamp for indicating the position of a letter. The document prepared using the terminal of FIG. 5 is printed on a facsimile terminal by one line or one page, upon application of the printing command.

When the document thus prepared is to be corrected or revised, a printed copy is put on the indicator 71, and then, the lamp 77 designates the position of the character to be corrected, by moving the lamp 77 through proper depression of the function keys 74. Then, the correction command, and the corrected key depress are accomplished on the key board 75. Then, those coded signals are stored in the buffer memory 64, and in repeating the above operation, the new revised image is obtained on the disk 39. The revised image is printed on a facsimile terminal. Alternatively, the revised image in the buffer memory 64 is directly printed on a facsimile terminal without transferring the revised image to the disk memory. Further, the revised image may be transmitted to an outside facsimile terminal through a telephone line 66, and in this case, a simple facsimile terminal at a remote location can function as a word processor.

It should be appreciated that the structure of the key board of FIG. 5 is very simple, and thus, the combination of the terminal of FIG. 2 and the terminal of FIG. 5 can provide the simplified facsimile system.

Figure 6:
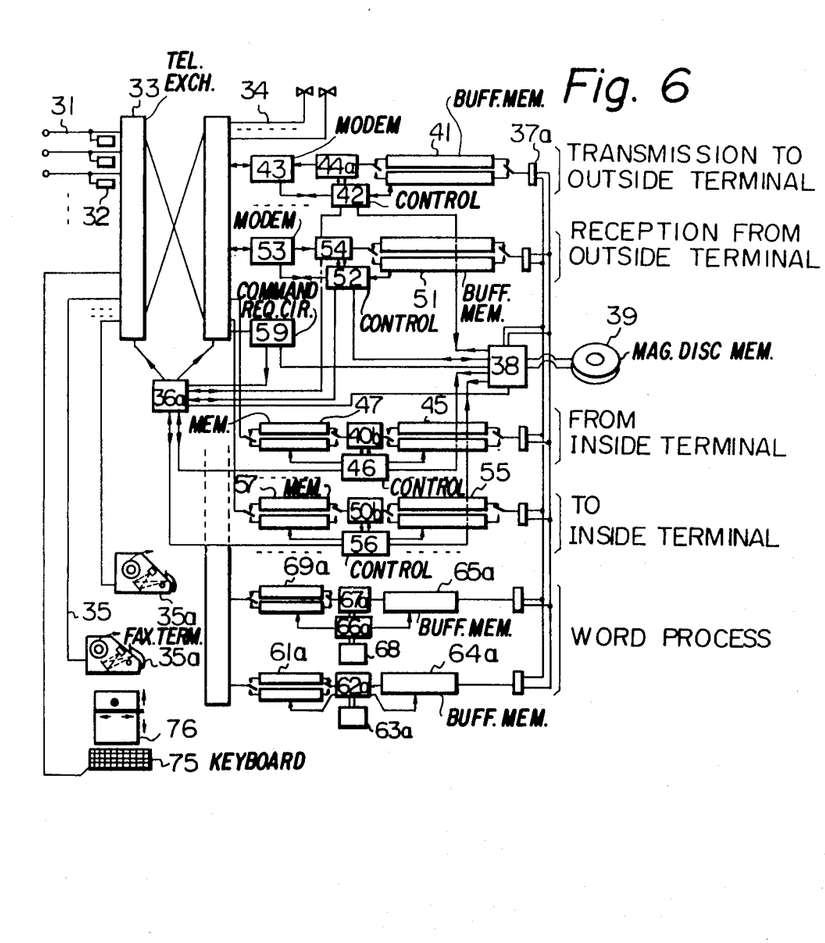
FIG. 6 is still another block diagram of the common control system for the present facsimile system.

FIG. 6 shows another embodiment of the common control system for the present facsimile system. In the figure, the reference numeral 31 is a telephone channel, 32 is a reception circuit of the called signal in the telephone line, 33 is a switching network for exchanging telephone channels, 34 is an extension telephone line within a building, 35 is an extension line for a facsimile terminal. The reference numeral 36a is a central processing unit for a telephone exchange system, and said unit 36a provides the necessary links for the connection of the channels of the cooperation with the computerized control units 42, 52, 46, and 56, which are provided for the control of the facsimile communication.

The transmission operation in which a facsimile terminal 35a or 75 transmits a picture signal is as follows. When a facsimile terminal generates a call, that facsimile terminal is connected to the command request circuit 59, which analyzes the address code from a facsimile terminal, and transfers the analyzed information to the picture store control block (47-40b-45) for storing a picture information in the disk memory 39. The reference numeral 47 is a memory composed of a pair of 256 bit sub-memories which are utilized alternately for storing picture data from a facsimile terminal temporarily. The data in the memory 47 is converted into the modified Hoffmann code form (G3 standard code recommended by CCITT; MH code) by the coder 40b and the control 46 which are implemented by a micro-computer. The converted data is stored in the buffer memory 45. This conversion is accomplished on a real time basis by utilizing a ROM conversion table. The buffer memory 45 has a pair of 4k bit sub-memories each of which is used alternately, that is to say, when the first one becomes full, the content of the same is transferred to the disk memory 39 through the disk control 38, and the second one is used for storing the data from the memory 47 during transferral of the data of the first one to the disk memory 39. By repeating the above operation, a picture signal from a facsimile terminal is stored in the disk memory 39 in the MH code form. The information quantity of a picture signal is compressed to 1/5 or 1/10 through the use of that MH code. Next, the disk control 38 transmits the address indicating the reception facsimile terminal through the control of the central processing unit 36a to the telephone line, and then, the G3 form transmission circuit (43-44a-41) is coupled with the telephone line through the switching network 33. The memory 41 has a pair of 4k bits sub-memories, which are used alternately, for storing the MH coded picture signal from the disk memory 39 temporarily. The reference numeral 43 is a modem of 4800 baud, or 9600 baud. In this embodiment, the modem 43 has only to have a transmission side (modulator). That modem 43 may also have a 300 baud modem for the communication of the protocol for establishing the facsimile communication through the control 44a, and the control 42. When an outside facsimile terminal can accept an MH code picture signal, that MH coded picture signal is transmitted directly to the outside terminal. On the other hand, when the outside terminal can not accept the MH coded picture signal, that MH coded picture signal is converted to the acceptable form (for instance, MR coded picture signal depending upon the outside terminal). The block 43-44a-41 may be coupled directly with the telephone line without using the switching network 33.

The reception operation of the embodiment of FIG. 6 is as follows. When the reception signal in the telephone line 31 is detected by the reception circuit 32, the central control unit 36a couples that reception signal with the available reception route 53-54-51 through the switching network 33. The reference numeral 53 has the reception side of a modem, 300 baud modem, and the tone detection function, and functions to handle the G3 standard signal or the G2 standard signal according to the command of the transmission terminal. When the reception signal is an MH coded picture signal, that reception signal is directly stored an buffer memory 51, which has a pair of 4k bit sub-memories, and when the reception signal is in the MR coded picture signal, that received picture signal is converted to an MH coded picture signal, and the converted signal is stored in the memory 51. When the received picture signal is in the G2 standard form, that picture signal is also converted to the MH coded picture signal, and is stored in the buffer memory 51. When one of the sub-memories 51 becomes full, the content of the same is transferred to the disk memory 39, and during the transfer to the disk memory, the received picture data is stored in the other sub-memory 51. By repeating the above operation, the full page of MH coded picture image is provided on the disk memory 39. The route 53-54-51 may be coupled directly with an outside channel without using an exchange network 33.

Next, the extension facsimile terminal in the building is recognized by the disk control 38, which establishes the necessary route 57-50b-55 for transferring the picture image on the disk memory 39 to the extension facsimile terminal by operating the central processing unit 36a. The MH coded signal on the disk is first transferred to one of the sub-memories 55, then, the content of the memory 55 is decoded to an original picture signal by the decoder 50b and the control 56. The decoded picture signal is stored in the other buffer memory 57 which has a pair of 256 bit sub-memories. The content of the buffer memory 57 is transferred to the inside reception facsimile terminal with the predetermined transmission speed, and the terminal prints when it receives the full data for the scanning line.

A pair of sub-memories 55 operate alternately, that is to say, when one of them is receiving data from the disk memory 39, the other transfers the content of the same to an external circuit. Similarly, a pair of buffer memories 57 operate alternately.

The reference numeral 37a is the data bus control coupled with the disk control 38, and that data bus control 37a performs the bus control and the buffer address control.

The embodiment of FIG. 6 can of course handle coded data by installing a module (61a through 69a), as in the case of FIG. 4. In the module, the reference numeral 61a is a code buffer, 62a is a control implemented by a micro-computer, 63a is another control for word processing function, and 64a is a buffer memory for storing processed data. Input data is input from the key board 75 in the coded form. The reference numeral 76 shows the coordinates or the arrangement of characters to be input. An input character may be either an alphanumerical character, or a Chinese character. Further, the conversion from an alphanumerical character to a Chinese character is possible by the operation of the control 63a. The coded data for a whole page is stored in the buffer memory 64a, and then, transferred to the disk memory 39.

When the content of the disk memory 39 is to be printed on a facsimile terminal, the key board 75 requests the printing to the disk memory 39, then, one line of data in the memory 39 is read-out into the buffer memory 65a. The control 66a and the character generator 68a generate the character pattern for the data in the buffer memory 65a, and the generated character pattern is stored in one of the sub-memories 69a as a main scanning signal for a facsimile terminal. By repeating that operation, the whole printing line is printed on a facsimile paper, and by repeating the printing for each line, the whole page is printed.

Finally, some effects particular to the present invention are listed below.

(a) A plurality of facsimile terminals with simple structure are installed. Therefore, a person can use a facsimile terminal at any location any time, as in the case of a telephone set.

(b) A coded data generated by a key board can be received by a facsimile terminal.

(c) Since many facsimile terminals are installed in a building, the manual distribution of the received facsimile letter is unnecessary.

(d) Since the received facsimile letter is stored in a disk memory, that letter can be confidential. When the letter is to be printed, one can print the facsimile letter personally.

(e) A plurality of the same data can be distributed to a plurality of facsimile terminals at the same time, by forwarding the letter from the disk memory to the terminals.

(f) The number of facsimile terminals can be increased easily, since the structure of the same is simple.

(g) When a new facsimile technical standard is issued, the present invention can easily handle that new standard, by attaching a new module for handling the new standard to the circuit of FIG. 3, FIG. 4 or FIG. 5.

(h) When a facsimile data is compressed, for instance by using a Hoffman code, the capacity of the disk memory is reduced.

(i) The common control system can double as a PBX telephone exchange system, and can handle a telephone set.

(j) The present facsimile system is able to be used as a part of a work station of a distributed type computer network, in which a key board terminal and a display terminal coupled with a central computer are located distributedly.

From the foregoing it will now be apparent that a new and improved facsimile system has been disclosed. It should be understood of course that the embodiments disclosed are merely illustrative and are not intended to limit the scope of the invention. Reference should be made to the appended claims, therefore, rather than the specification as indicating the scope of the invention.

What is claimed is:

1. A common controlled facsimile system, including a plurality of facsimile terminals each having means for converting a picture pattern of an original document to a transmitted scanned electrical facsimile picture signal and means for printing a received scanned electrical facsimile picture signal on a paper comprising:

a common facsimile control system coupled with said plurality of facsimile terminals, said common control system including a switching exchange network coupled with a plurality of external telephone channels and a plurality of extension telephone terminals to provide an exchange function among said telephone terminals and said external telephone channels;

a MODEM provided commonly for said plurality of facsimile terminals and coupled with said switching exchange network for connecting a facsimile terminal with a telephone channel;

a magnetic disc memory for storing a picture image of a facsimile picture signal;

a buffer memory for temporarily storing a facsimile picture signal while said signal is being stored in or read-out from said magnetic disc memory;

means for compressing a facsimile picture signal and means for reproducing an original facsimile picture signal from a compressed picture signal, whereby a picture signal may be stored in said magnetic disc memory in compressed form;

means for communication protocol control of a facsimile terminal provided common to said plurality of facsimile terminals; and means for controlling operation of said common facsimile control system whereby a facsimile picture signal generated by one of said plurality of facsimile terminals is first stored in said magnetic disc memory through said switching exchange network, said facsimile picture signal compressing means and said buffer memory, and the stored facsimile picture signal in said magnetic disc memory is then transferred to a designated facsimile terminal through said buffer memory, said original facsimile picture reproducing means, and said switching exchange network to reproduce an image at said designated facsimile terminal.

2. A common controlled facsimile system as claimed in claim 1, further comprising a key board terminal coupled with said common facsimile control system, and said common facsimile control system further comprising a character generator and a second MODEM for coupling said key board terminal with said magnetic disk memory, and being operable so that coded data generated by said key board terminal is converted to a picture image by said character generator and said converted picture image is stored in said magnetic disk memory.

3. A common facsimile system as claimed in claim 2, said key board terminal further comprising an indicator for showing the location of each character, and correction and revision of a character stored in said magnetic disk memory is accomplished by providing a new character from said key board terminal in the location indicated by said indicator.

* * * * *